Oct. 13, 1925.

H. D. GEYER

STEERING WHEEL

Filed Jan. 23, 1924

Inventor.
Harvey D. Geyer
By Spencer, Sewall & Hardman
his Attorneys.

Oct. 13, 1925.
H. D. GEYER
STEERING WHEEL
Filed Jan. 23, 1924
1,557,198
2 Sheets-Sheet 2
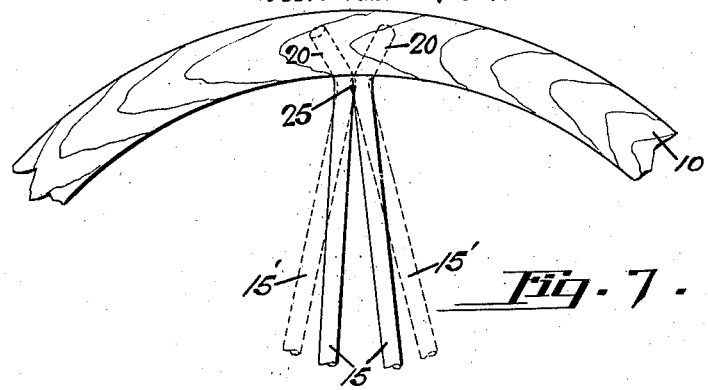
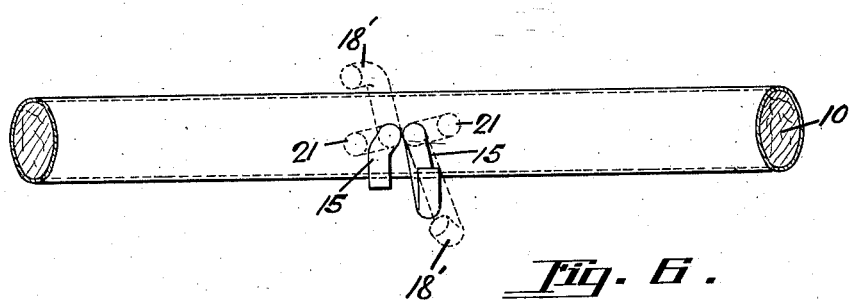
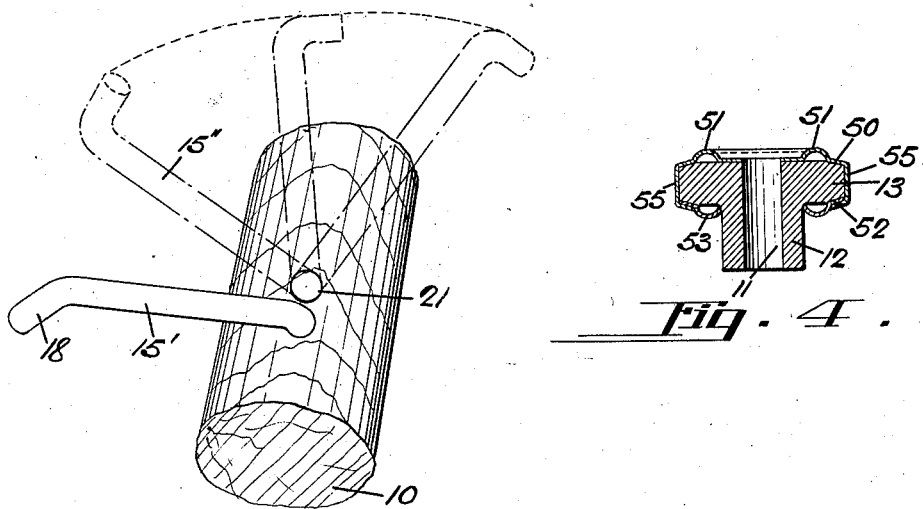
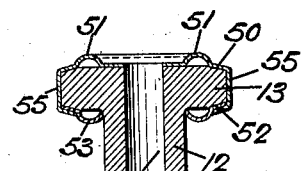

Patented Oct. 13, 1925.

1,557,198

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

STEERING WHEEL.

Application filed January 23, 1924. Serial No. 687,942.

*To all whom it may concern:*

Be it known that I, HARVEY D. GEYER, a citizen of the United States of America, residing at Dayton, county of Montgomery, and State of Ohio, have invented certain new and useful Improvements in Steering Wheels, of which the following is a full, clear, and exact description.

This invention relates to handwheels especially such as are ordinarily employed as steering wheels on automotive vehicles.

An object of this invention is to provide a handwheel of high strength and pleasing appearance and one which is economical to manufacture.

A more specific object is to provide a metallic spider which may have its spokes inserted in holes in the rim after said rim has been finished without in any way marring the finished surface of the rim.

Another object is to provide a metallic spider having very small section metal spokes which are grouped in pairs and covered with a sheath to give the appearance of larger section spokes.

Another object is to provide an improved and economical method of assembling the spider and rim.

Another object is to provide an improved method of covering the rim with a protective sheath having suitable corrugations on its inner periphery for a hand grip.

Further objects and advantages of the present invention will be apparent from the following description, reference being had to the accompanying drawings, wherein a preferred form of embodiment of the present invention is clearly shown.

In the drawings:

Fig. 4 is a section on line 4—4 of Fig. 1.

Fig. 5 is a perspective view showing how the spokes may be turned to clear each other while they are being inserted in the rim, and is taken looking in the direction shown by line 5—5 of Figs. 1 and 2.

Fig. 6 is a view showing in full lines a pair of spokes inserted in the rim and turned to their normal position, and in dotted lines the pair of spokes turned to a position to permit insertion in the rim.

Fig. 7 is a plan view showing the positions of the spokes as shown in Fig. 6.

In the drawings, similar reference characters refer to similar parts through the several views.

Figure 1:
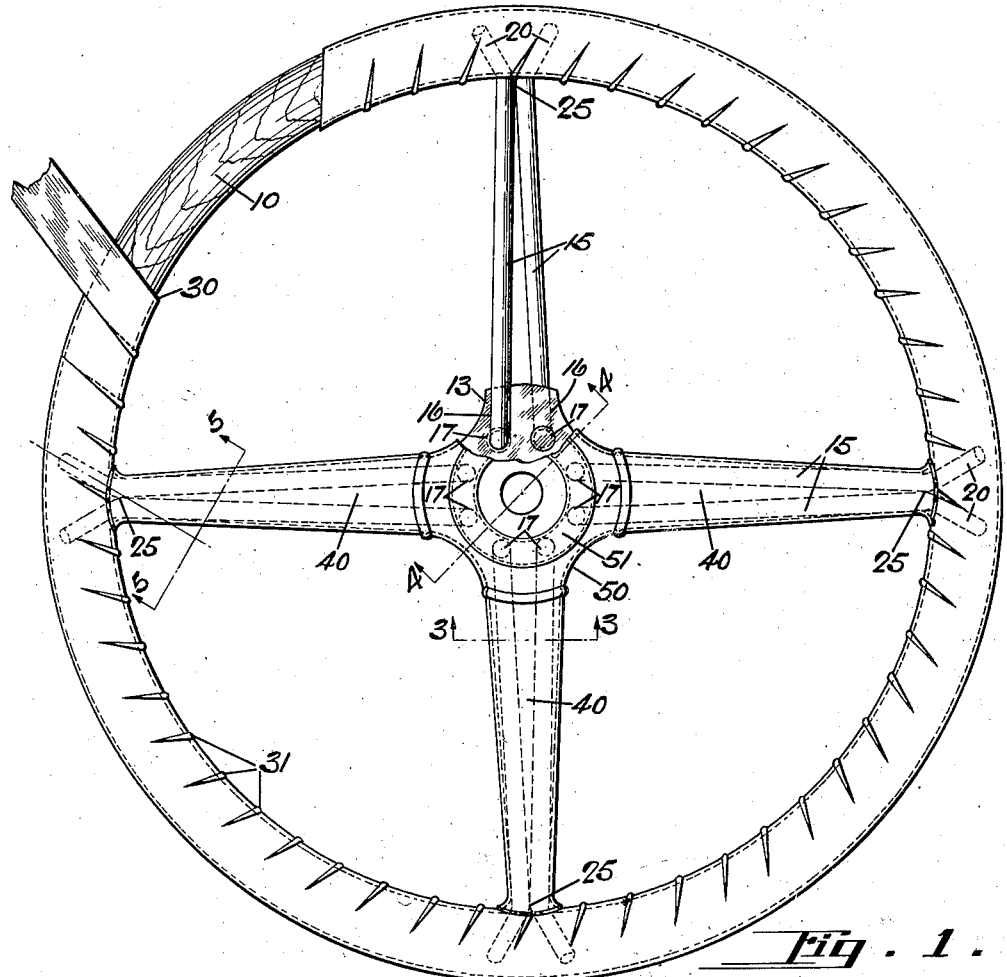
Fig. 1 is a plan view of a steering wheel made according to this invention and shows parts broken away to show details of construction as well as the method of wrapping the rim with a strip of protective material.

Numeral 10 designates the rim which preferably is formed of wood and in any suitable and well known manner. The hub 11 is preferably a casting having the sleeve portion 12 for suitably fastening to a column and a flange portion 13 to which the spokes 15 are rigidly secured. This flange 13 is provided with pairs of slots 16 in opposite faces of the flange for receiving the inner ends of spokes 15. At the inmost end of each slot 16 the hole 17 extends entirely through the flange 13. The spokes 15 snugly fit the slots 16 and have their inner ends bent as at 18 to extend entirely through the holes 17 and have their projecting ends riveted over as at 19 to form a strong rigid connection between the spokes and hub 11.

Figure 2:
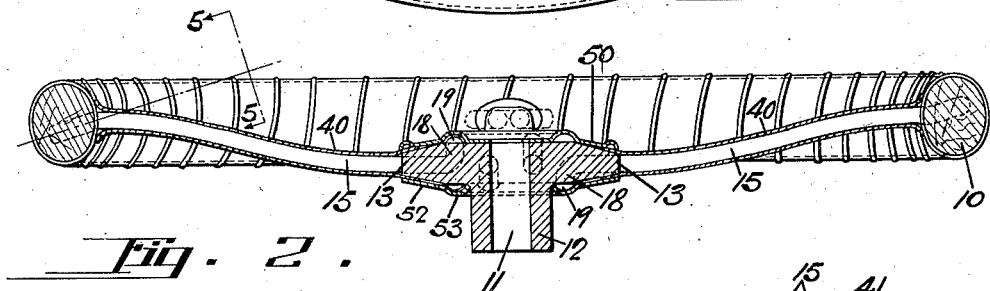
Fig. 2 is a section through the center line of Fig. 1.

The outer ends 20 of the spokes 15 are bent at an angle to the radial direction and are inserted in corresponding holes 21 in the inner periphery of the rim 10, whereby the spokes 15 are locked against radial withdrawal from the holes 21. Since the spokes 15 lie substantially side by side it is obvious that the first spoke inserted in one of a pair of holes 21 must be rotated out of its normal position in order to clear the second hole 21 to permit the insertion of the second spoke therein. Fig. 5 is a view looking down the center line of one of the holes 21 and shows a spoke 15′ inserted in the other hole 21 and rotated about the axis of the bent end 20 to entirely clear the other hole 21 and thus permit the easy insertion of the other spoke 15″. The two holes 21 are preferably drilled in the rim 10 not only at an angle to the radial line but also at an angle to the plane of the rim 10, as clearly shown in Figs. 2 and 6. Drilling at an angle to the plane of the rim permits the holes 21 to be drilled closer together and still obtain sufficient clearance to insert the second spoke when the first inserted spoke has been rotated out of its normal position. Figs. 6 and 7 show how the spokes 15 clear each other to permit insertion of the second spoke when they are rotated to the dotted position 15′, but show how they abut and press tightly against one another at the point 25 when they are rotated to their normal position shown in full lines. This pressure against each other at point 25 causes the ends 20 to be very rigidly held in the recesses 21 in the rim, as will be readily understood.

An important feature of this invention is the protective covering 30 for the rim 10. This covering 30 may be of the material commonly known in the trades as celluloid or pyralin and is applied to the rim in the form of a spirally wound strip which has first been rendered soft and flexible by proper and well known treatment with acetone or other suitable solvent. This strip is wound on the rim so that the edges thereof overlap a slight amount on the inner periphery of the rim but abut and lie smooth on the outer periphery of the rim. After the rim has been entirely covered the edges of the strip are connected or welded together by treatment with acetone to form a unitary sheath which is smooth on the outer periphery but has corrugations 31 on its inner periphery which serve as a suitable hand grip.

The holes 21 for the spokes 15 are preferably drilled after the covering 30 has been applied. The separate spokes 15 are then inserted in the manner described above. The inner ends of spokes 15 are separated far enough to permit the hub 11 to be moved into place between them, after which the bent ends 18 are inserted in the holes 17 and riveted over on the opposite side of flange 13 as shown at 19. The rim, spokes, and hub will all be then held in very rigid relation to one another. A special advantage in this method of securing a metal spider to a rim is the fact that the rim may be entirely finished before the insertion of the spider, and the later insertion of the spider does not mar the finished rim in any way so as to require any re-finishing operation.

Figure 3:
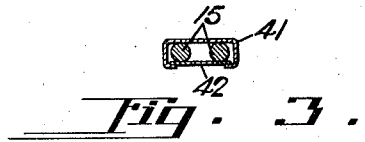
Fig. 3 is a section on line 3—3 of Fig. 1.

After the spider is rigidly assembled and secured to the rim the double spokes 15 have applied thereto a sheath 40 of celluloid or similar material which is preferably made in two pieces 41 and 42, as clearly shown in Fig. 3. These pieces 41 and 42 are cut to form a snugly fitting sheath for the two spokes 15, except the sheath 40 is preferably provided with an outwardly flaring end where it adjoins the rim 10. After being applied, the pieces 41 and 42 are cemented or welded together by acetone or other suitable solvent, at the seams as well as to the covering 30 of the rim 10 giving a well shaped outer end to the sheath 40. The inner ends of the celluloid pieces 41 and 42 lap over on the flange 13 of the hub a short distance, as clearly shown in Fig. 2. The hub 11 is provided with a cover plate 50 which covers the entire upper surface of the hub 11 and laps over the inner ends of the sheath 40 for the spokes. The cover plate 50 is preferably provided with a raised circular bead 51 to clear the riveted heads 19 of the spokes 15. A similar cover plate 52, having a raised circular bead 53 to clear the lower riveted heads 19, may be provided for the under side of the flange 13. The cover plates 50 and 52 are preferably secured in place by the plate 50 being provided with four flanges 55 extending downwardly between the four spokes, thus covering the arc-shaped lateral surfaces of the flange 13, and being turned over on the plate 52, all as clearly shown in Fig. 4. The plates 50 and 52 are preferably sheet aluminum stampings which therefore greatly improve the appearance of the wheel and render it unnecessary to machine any part of the hub flange 13.

While the form of embodiment of the present invention as herein disclosed, constitutes a preferred form, it is to be understood that other forms might be adopted, all coming within the scope of the claims which follow.

What is claimed is as follows:

1. A handwheel having a rim and a spider, said spider including a metal hub and a plurality of separate metal spokes rigidly secured thereto, said spokes having their outer ends bent at an angle and inserted in corresponding recesses in the rim whereby said spokes are locked against radial withdrawal, alternate spokes having their outer ends bent in different directions.

2. A handwheel having a rim and a spider, said spider including a metal hub and a plurality of pairs of metal spokes rigidly secured thereto, the spokes of each pair having their outer ends bent apart and inserted in corresponding recesses in the rim.

3. The method of assembling a rim and spider including: cutting pairs of angularly related holes in close proximity on the inner periphery of the rim, inserting the bent outer ends of pairs of spokes in said recesses while said spokes are turned to a position to clear one another during the insertion of said bent ends, and then rotating said spokes to lie substantially side by side, and rigidly securing the inner ends of said spokes to a central hub.

4. The method of assembling a rim and spokes including: cutting pairs of angularly related holes in close proximity on the inner periphery of the rim, inserting the bent outer ends of pairs of spokes in said recesses while said spokes are turned to a position to clear one another during the insertion of said bent ends, and then rotating said spokes to their proper position thus causing them to press against each other adjacent the rim and securing the inner ends of said spokes to a central hub.

5. The method of attaching spokes to a rim including: cutting pairs of angularly related holes in close proximity on the inner periphery of the rim, inserting the bent outer ends of pairs of spokes in said recesses while said spokes are turned to a position to clear each other to permit said insertion of the outer ends, and then rotating said spokes to their normal position.

6. The method of attaching spokes to a rim including: cutting pairs of angularly related holes in close proximity on the inner periphery of the rim, inserting the bent outer ends of pairs of spokes in said recesses while said spokes are turned to a position to clear each other to permit said insertion of the outer ends, and then rotating said spokes to their normal position, thus causing them to press tightly against each other adjacent the rim.

7. A handwheel having a rim and a spider, said spider including: a metal hub and a plurality of pairs of laterally spaced metal spokes rigidly secured to said hub at their inner ends and to said rim at their outer ends, and a sheath for each pair of spokes whereby the pairs of spokes are covered to give the appearance of single spokes.

8. A handwheel having a rim and a spider, said spider including: a metal hub and a plurality of pairs of laterally spaced metal spokes rigidly secured to said hub at their inner ends and to said rim at their outer ends, and a non-metallic sheath for each pair of spokes whereby the pairs of spokes are covered to give the appearance of single spokes.

9. A handwheel having a rim and a spider, said spider including: a metal hub and a plurality of pairs of laterally spaced metal spokes rigidly secured to said hub at their inner ends and to said rim at their outer ends, said spokes being spaced farther apart at their inner ends than at their outer ends, and a sheath for each pair of spokes whereby the pairs of spokes are covered to give the appearance of single spokes.

10. A handwheel rim having its surface covered with a non-metallic moldable material put on as a spirally wound strip with overlapping edges on the inner periphery of the rim and with flush edges on the outer periphery thereof, the edges of the strip being cemented together to form a substantially unitary sheath for said rim.

11. A handwheel rim having its surface covered with celluloid or similar material put on as a spirally wound strip with overlapping edges on the inner periphery of the rim and with flush edges on the outer periphery thereof, the edges of the strip being cemented together to form a substantially unitary sheath for said rim.

12. The method of covering a handwheel rim with a hard non-metallic material including: spirally wrapping said rim with a temporarily softened strip of said material so that the edges of said strip lie substantially flush on the outer periphery of the rim but overlap on the inner periphery thereof, and then combining the edges of said strip together to form a substantially unitary sheath smooth on the outer periphery but corrugated on the inner periphery.

13. A handwheel spider comprising: a metal hub adapted to be rigidly secured to a shaft, said hub having lateral projections, each projection having a pair of circumferentially spaced apertures therethrough; and a plurality of pairs of spokes, the spokes of each pair being circumferentially spaced relatively close together as compared with the next adjacent spokes, and having their inner ends bent at an angle and extending through said apertures and riveted over on the opposite side of said projections to form a rigid connection between the spokes and hub, the spokes of each pair extending through the same projection from opposite sides thereof.

In testimony whereof I hereto affix my signature.

HARVEY D. GEYER.